United States Patent
Hori

(10) Patent No.: US 12,460,152 B2
(45) Date of Patent: Nov. 4, 2025

(54) EDIBLE OIL/FAT IN WHICH CONTENT OF GLYCIDOL AND GLYCIDOL FATTY ACID ESTER ARE REDUCED, AND METHOD FOR MANUFACTURING SAID EDIBLE OIL/FAT

(71) Applicant: FUJI OIL CO., LTD., Osaka (JP)

(72) Inventor: Katsuhito Hori, Osaka (JP)

(73) Assignee: FUJI OIL CO., LTD., Osaka (JP)

( * ) Notice: Subject to any disclaimer, the term of this patent is extended or adjusted under 35 U.S.C. 154(b) by 707 days.

(21) Appl. No.: 17/787,934

(22) PCT Filed: Dec. 25, 2020

(86) PCT No.: PCT/JP2020/048878
§ 371 (c)(1),
(2) Date: Jun. 21, 2022

(87) PCT Pub. No.: WO2021/132617
PCT Pub. Date: Jul. 1, 2021

(65) Prior Publication Data
US 2023/0032784 A1 Feb. 2, 2023

(30) Foreign Application Priority Data

Dec. 25, 2019 (JP) ................................. 2019-234248
Sep. 18, 2020 (JP) ................................. 2020-157773

(51) Int. Cl.
*C11B 3/04* (2006.01)
*A23D 9/02* (2006.01)
*C11B 3/00* (2006.01)

(52) U.S. Cl.
CPC ................. *C11B 3/04* (2013.01); *A23D 9/02* (2013.01); *C11B 3/001* (2013.01)

(58) Field of Classification Search
CPC ... C11B 3/04; C11B 3/001; C11B 3/10; C11B 3/14; A23D 9/02; A23D 9/04
See application file for complete search history.

(56) References Cited

U.S. PATENT DOCUMENTS

2014/0357882 A1* 12/2014 Bhaggan .................. C11B 3/14
554/192
2015/0166930 A1 6/2015 Hled et al.

FOREIGN PATENT DOCUMENTS

| CN | 103857776 | 6/2014 |
| CN | 104159454 | 11/2014 |
| CN | 104694250 | 6/2015 |
| CN | 111065720 | 4/2020 |
| CN | 113755240 | 12/2021 |
| JP | 2011147436 | 8/2011 |
| JP | 2011174091 | 9/2011 |
| JP | 2016185998 | 10/2016 |
| JP | 2016185998 A * | 10/2016 |
| JP | 2017014511 | 1/2017 |
| WO | 2016121604 | 8/2016 |
| WO | 2019027315 | 2/2019 |
| WO | 2019038320 | 2/2019 |

OTHER PUBLICATIONS

"Search Report of Europe Counterpart Application", issued on Jan. 2, 2023, pp. 1-8.
"International Search Report (Form PCT/ISA/210) of PCT/JP2020/048878", mailed on Mar. 2, 2021, with English translation thereof, pp. 1-5.
Akio Kato, "Use of palm oil and palm kernel oil," publisher: Koshobo, Jul. 1990, with partial English translation thereof, p. 39.
"Office Action of China Counterpart Application", issued on Apr. 13, 2024, with English translation thereof, p. 1-p. 17.
Ren Woxing et al., "Effect of corn oil deodorization on 3—MCPD esters and glycidol esters", China Oils and Fats, with English abstract, Apr. 18, 2018, pp. 1-10, vol. 43, No. 4.
"Office Action of China Counterpart Application", issued on Jan. 21, 2024, with English translation thereof, p. 1-p. 20.
Food Safety and Consumer Affairs Bureau, Ministry of Agriculture, Forestry and Fisheries, "The results of examination of the content of 3-MCPD fatty acid ester and glycidol fatty acid ester in foods," Dec. 2014, with partial English translation thereof, pp. 1-32.
World Health Organization, International Agency for Research on Cancer, "IARC Monographs on the Evaluation of Carcinogenic Risks to Humans," vol. 77, Feb. 2000, pp. 1-20.

* cited by examiner

*Primary Examiner* — Deborah D Carr
(74) *Attorney, Agent, or Firm* — JCIPRNET

(57) ABSTRACT

The present invention addresses the problem of providing an oil/fat in which the glycidol content and glycidol fatty acid ester content are reduced. A method for manufacturing an edible fat/oil, wherein a step for decolorizing and deodorizing an oil/fat that contains a palm-based oil/fat, in which physically refined palm oil (RBDPO) is used as a raw material, includes a step for performing an acid-induced contacting process during a decolorization work step.

2 Claims, No Drawings

EDIBLE OIL/FAT IN WHICH CONTENT OF GLYCIDOL AND GLYCIDOL FATTY ACID ESTER ARE REDUCED, AND METHOD FOR MANUFACTURING SAID EDIBLE OIL/FAT

CROSS-REFERENCE TO RELATED APPLICATION

This application is a 371 of international application of PCT application serial no. PCT/JP2020/048878, filed on Dec. 25, 2020, which claims the priority benefit of Japan applications no. 2019-234248, filed on Dec. 25, 2019 and no. 2020-157773, filed on Sep. 18, 2020. The entirety of each of the above-mentioned patent applications is hereby incorporated by reference herein and made a part of this specification.

TECHNICAL FIELD

The present invention relates to an edible oil/fat in which the content of glycidol and glycidol fatty acid esters is reduced, and a method for manufacturing the same.

BACKGROUND ART

Glycidol is a compound in which an epoxy ring is formed at the 2- and 3-positions of a glycerol framework. In recent years, glycidol fatty acid esters in which fatty acids are ester-bonded to glycidol have been detected in a plurality of types of edible oils/fats. It has been reported that, particularly, the content of palm oils/fats and refined edible oils/fats made from palm oils/fats as a raw material is relatively high among oils/fats in which the presence of glycidol fatty acid esters is confirmed (Non-Patent Literature 1).

When a glycidol fatty acid ester is ingested in the body, there is a concern that it will be hydrolyzed by the action of lipase present in the body and produce glycidol. Glycidol is classified as "Group 2A" by the International Agency for Research on Cancer (IARC). "Group 2A" is the group into which compounds that are probably carcinogenic to humans are classified (Non-Patent Literature 2).

Based on the above circumstances, it is desired to develop an oil/fat in which the content of glycidol and glycidol fatty acid esters is reduced.

Patent Literature 1 to 3 disclose methods for reducing the content of glycidol and glycidol fatty acid esters. Glycidol and glycidol fatty acid esters tend to be produced during a deodorizing treatment, and Patent Literature 1 discloses a glyceride composition that is subjected to a low-temperature deodorizing treatment at 190 to 230° C.

CITATION LIST

Patent Literature

PCT International Publication No. WO 2016/121604

Patent Literature 1

Japanese Patent Laid-Open No. 2011-147436

Patent Literature 2

PCT International Publication No. WO 2019/038320

Patent Literature 3

PCT International Publication No. WO 2019/027315

Non-Patent Literature

Non-Patent Literature 1

Dec. 17, 2014, The results of examination of the content of 3-MCPD fatty acid ester and glycidol fatty acid ester in foods, Food Safety and Consumer Affairs Bureau, Ministry of Agriculture, Forestry and Fisheries (2012, 2013).

Non-Patent Literature 2

IARC, IARC Monogr, Eval, Carcinog, Risks Hum., 77, 469-486, 2000

SUMMARY OF INVENTION

Technical Problem

Patent Literature 2 and 3 disclose a process of refining a physically refined palm oil (RBDPO) from a crude palm oil (CPO), and do not describe a step of refining a physically refined palm oil (RBDPO).

It has been found that the method in Patent Literature 1 has a problem that a decrease in the acid value of refined oil after deodorization is insufficient, and the refined oil flavor becomes oily.

In order to address the above problem, an objective of the present invention is to provide an edible oil/fat which has favorable flavor and color, and in which the content of glycidol and glycidol fatty acid esters is reduced to a satisfactory level, and a method for manufacturing the same.

Solution to Problem

The inventors conducted extensive studies, and as a result, found that, when a raw oil/fat having a 3-chloro-1,2-propanediol (3-MCPD) concentration of a certain level or less is subjected to a step of performing an acid-induced contacting process during a decolorization work step, the flavor and color become favorable and the content of glycidol and glycidol fatty acid esters is reduced, and completed the present invention.

Specifically, the present invention is as follows.

(1) A method for manufacturing an edible oil/fat in which the content of glycidol and glycidol fatty acid esters is reduced, and in which, in a step of decolorizing and deodorizing an oil/fat containing a palm-based oil/fat using a physically refined palm oil (RBDPO) as a raw material, the following raw oil/fat is used, a decolorization work step includes a step of adding an acid to an aqueous solution, and the following edible oil/fat is obtained after the step of decolorizing and deodorizing:

a raw oil/fat: an oil/fat containing a palm-based oil/fat and having a 3-MCPD concentration of 1.5 mg/kg or less
  an edible oil/fat after the step of decolorizing and deodorizing: the content of glycidol and glycidol fatty acid esters is 1.0 mg/kg or less in an equal amount of glycidol.

(2) The method for manufacturing an edible oil/fat in which the content of glycidol and glycidol fatty acid esters is reduced according to (1), wherein 0.01 to 10 weight % of the following aqueous solution as an acid is added.

a citric acid and/or phosphoric acid aqueous solution having a concentration of 1 to 85 weight %.

(3) The method for manufacturing an edible oil/fat in which the content of glycidol and glycidol fatty acid esters is reduced according to (1) or (2), wherein the deodorizing step is performed under the following conditions:

a degree of vacuum of 100 to 800 Pa
an amount of water vapor used of 0.5 to 5 weight %
a deodorizing temperature of 230 to 260° C.

(4) A method for reducing the content of glycidol and glycidol fatty acid esters in an edible oil/fat by the method for manufacturing an edible oil/fat in which the content of glycidol and glycidol fatty acid esters is reduced according to any one of (1) to (3).

Advantageous Effects of Invention

According to the present invention, it is possible to provide an edible oil/fat in which the content of glycidol and glycidol fatty acid esters is reduced.

The content of glycidol and glycidol fatty acid esters in the obtained deodorized oil/fat can be reduced to 1.0 mg/kg or less, and preferably 0.5 mg/kg or less in an equal amount of glycidol.

DESCRIPTION OF EMBODIMENTS

Hereinafter, the present invention will be described in detail.

As the raw oil/fat that can be used in the present invention, an oil/fat containing a palm-based oil/fat having a 3-MCPD concentration of 1.5 mg/kg or less can be used. When a raw oil/fat having a 3-MCPD concentration exceeding 1.5 mg/kg is used, the effect of the present invention may not be obtained.

A palm oil manufacturing step includes a step of refining a crude palm oil (CPO) in which a physically refined palm oil (RBDPO) is obtained from a crude palm oil (CPO) obtained by squeezing the fruit pulp of oil palm through a refining step such as degumming, deoxidizing, decolorizing, deodorizing, and dewaxing, and a step of refining from the physically refined palm oil (RBDPO) in which the physically refined palm oil (RBDPO) is additionally subjected to refining such as decolorizing and deodorizing.

The manufacturing method of the present invention is applied to a step of manufacturing from a physically refined palm oil (RBDPO).

In the present invention, as the palm-based oil/fat, a physically refined palm oil, and an oil fraction obtained from a physically refined palm oil as a raw material can be used. Examples of oil fractions made from a physically refined palm oil as a raw material include palm olein, palm superolein, palm stearin, and palm mid fractions.

In the present invention, as the palm-based oil/fat, an oil/fat (hereinafter referred to as (B)) processed using a palm-based oil/fat (hereinafter referred to as (A)) can be used. Examples of processing methods include hardening, separation using a hardened oil as a raw material, hardening using a fractionated oil as a raw material, and transesterification.

As the raw material of (B), in addition to (A), oils/fats of (B) can also be used, and (A) and/or (B) is contained as an essential component, but otherwise, other edible oils/fats may be contained. Examples of oils/fats that can be used include plant oils/fats such as soybean oil, rapeseed oil, corn oil, cottonseed oil, peanut oil, sunflower oil, rice bran oil, safflower oil, olive oil, sesame oil, medium-chain fatty acid-bound oil/fat (MCT), coconut oil, and palm kernel oil, animal fats such as milk fat, beef tallow, and lard, and their hardened oils, fractionated oils, hardened fractionated oils, and separately hardened oils, processed oils/fats subjected to transesterification or the like, and mixed oils/fats thereof.

In the present invention, the raw oil/fat contains the above palm-based oil/fat as an essential component, but it may contain other edible oils/fats in addition to the palm-based oil/fat. Examples of oils/fats that can be used include plant oil/fat such as soybean oil, rapeseed oil, corn oil, cottonseed oil, peanut oil, sunflower oil, rice bran oil, safflower oil, olive oil, sesame oil, medium-chain fatty acid-bound oil/fat (MCT), coconut oil, and palm kernel oil, animal fats such as milk fat, beef tallow, and lard, and their hardened oils, fractionated oil, hardened fractionated oil, and separately hardened oil, processed oils/fats subjected to transesterification or the like, and mixed oils/fats thereof.

In the present invention, the step of decolorizing and deodorizing includes all a series of steps in the manufacturing step, and is not limited to the manufacturing step in a reaction device such as a decolorization can or a deodorizing tower. The step of decolorizing and deodorizing is composed of a decolorization work step and a deodorizing work step.

In the present invention, the decolorization work step includes a decolorization preparation step in which a raw oil/fat is transferred to a reaction device (decolorization can) that performs a decolorization step, a decolorization step that is performed under a reduced pressure by adding a processing aid such as decolorized white clay to the decolorization can and heating the decolorization can, and a decolorization filtration step in which cooling is performed as necessary after decolorization and white clay is filtered off, and is composed of a series of steps: the above decolorization preparation step, decolorization step, and decolorization filtration step.

In the present invention, the deodorizing work step includes a deodorization preparation step in which a decolorizing oil after decolorization filtration is transferred to a deodorizing container (deodorizing tower), a deodorizing step in the deodorizing tower, and a deodorizing post-treatment step including cooling, addition of an antioxidant, and the like, and is composed of a series of steps: the above deodorization preparation step, deodorizing step, and deodorizing post-treatment step.

In the present invention, in the step of decolorizing and deodorizing an oil/fat containing a palm-based oil/fat, the decolorization work step includes a step of adding an acid to an aqueous solution. Preferably, a step of adding an acid to an aqueous solution is included immediately before the decolorization step in the decolorization work step. Inclusion of the step of adding an acid to an aqueous solution immediately before the decolorization step in the decolorization work step means that no other step is provided between the step of adding an acid to an aqueous solution and the decolorization step. Examples of other steps include an alkaline deoxidizing step, a washing step, a dehydration step, a transesterification reaction step, and a deodorizing step.

Examples of acids used in the present invention include organic acids and/or inorganic acids. Examples of organic acids include at least one organic acid selected from the group consisting of ascorbic acid, erythorbic acid, lactic acid, tartaric acid, citric acid, gallic acid, phosphoric acid, and malic acid, and salts thereof, and derivatives thereof. As the inorganic acid, it is preferable to use phosphoric acids, and examples thereof include orthophosphoric acid, diphosphoric acid (pyrophosphoric acid), and metaphosphoric acid.

As a preferable form of the present invention, an aqueous solution containing citric acid and/or phosphoric acid as an acid is used. Preferably, the concentration of the citric acid and/or phosphoric acid aqueous solution to be added is 1 to 85 weight %, and the amount of the citric acid and/or phosphoric acid aqueous solution added is 0.01 to 10 weight %. Within the above range, no particular conditions are designated, except that the amount of the citric acid and/or phosphoric acid aqueous solution added is more preferably 0.01 to 5 weight %, still more preferably 0.05 to 1 weight %, and yet more preferably 0.05 to 0.5 weight % within the above range. If the amount of the citric acid and/or phosphoric acid aqueous solution added is less than 0.01 weight %, the amount of glycidol and glycidol fatty acid esters reduced may be insufficient. On the other hand, if the amount thereof exceeds 10 weight %, the load on the facility may increase.

The deodorizing step is preferably performed at a deodorizing temperature of 230 to 260° C., a degree of vacuum 100 to 800 Pa, and an amount of water vapor used of 0.5 to 5 weight %. If the deodorizing temperature is lower than 230° C., this is not preferable because the flavor and color of the edible oil/fat after deodorization may deteriorate. If the deodorizing temperature exceeds 260° C., this is not preferable because the content of glycidol and glycidol fatty acid esters may increase. The degree of vacuum is more preferably 200 to 800 Pa, and still more preferably 200 to 700 Pa. If the degree of vacuum exceeds 800 Pa, this is not preferable because the flavor of the edible oil/fat after deodorization may deteriorate. In addition, if the amount of water vapor used is 0.5 weight % or less, similarly, this is not preferable because the flavor of the edible oil/fat is worse after deodorization. On the other hand, if the amount of water vapor used exceeds 5 weight %, this is not preferable because the load on the facility may increase. The deodorizing time is preferably 30 to 120 minutes, and particularly preferably 60 minutes to 90 minutes. If the deodorizing time is shorter than 30 minutes, this is not preferable because the flavor of the edible oil/fat after deodorization may deteriorate. If the deodorizing time exceeds 120 minutes, this is not preferable because the content of glycidol and glycidol fatty acid esters may increase.

Examples of deodorizing devices used in the present invention include vacuum water vapor distillation devices, which may be of a batch type, a semi-continuous type, a continuous type or the like. If the amount of the oil/fat to be treated is small, it is preferable to use a batch type device, and if the amount thereof is large, it is preferable to use a semi-continuous type or continuous type device.

As the semi-continuous type device, for example, a Gardler type deodorizing device composed of a deodorizing tower including several trays can be used. This device performs processing by supplying an oil/fat from the upper part, making contact between the oil/fat on the tray and water vapor for an appropriate time, and then lowering the oil/fat to the lower tray, and moving it while intermittently lowering it one batch at a time. As the continuous type device, a thin film deodorizing device or the like that can bring a thin film-like oil/fat into contact with water vapor can be used. It is preferable to use a semi-continuous type device because the temperature and the amount of water vapor used can be managed.

In the present invention, the content of glycidol and glycidol fatty acid esters is measured by the following method.

0.3 mL of isooctane is added to 100 mg of an oil/fat sample, and the oil/fat sample is dissolved. 3 mL of a sodium bromide solution containing 90 U/mL lipase is put into a test tube, and the test tube is shaken with a shaker for 30 minutes. After the test tube is heated at 80° C. for 10 minutes, the test tube is allowed to cool or water-cooled until it reaches room temperature. 50 µL of a 2.0 µg/mL internal standard mixed solution and 3 mL of hexane are put into the test tube, and the lid is closed. The test tube is stirred with a Vortex mixer and centrifuged, and an aqueous layer is then transferred to a new test tube with a Pasteur pipette. 3 mL of hexane is added to the test tube to which the aqueous layer has been transferred, the lid is closed, stirring is performed with a Vortex mixer, centrifuging is performed and an organic layer is then removed. 20 µL of a phenylboronic acid solution and 3 mL of hexane are added to the test tube, and the lid is closed. The test tube is shaken with a shaker for 10 minutes. The organic layer is transferred to a new test tube with a Pasteur pipette. The organic layer in the new test tube is concentrated to 0.5 to 0.8 mL with nitrogen gas, and analyzed through GC-MS.

Here, for GC-MS, quantification is performed using molecular ion peaks m/z 147 and m/z 150.

EXAMPLES

Hereinafter, the present invention will be described in more detail with reference to examples. Here, in the examples, % is based on weight.

As the physically refined palm oil, a physically refined palm oil (RBDPO) obtained by degumming, decolorizing, and deodorizing a crude palm oil (CPO) with a phosphoric acid aqueous solution was used.

Example 1

A physically refined palm oil having a 3-MCPD concentration of 0.31 mg/kg was subjected to a decolorizing-deodorizing step. 0.1 weight % of a 50% citric acid aqueous solution based on the weight of the oil/fat was added to a physically refined palm oil as a raw material. 1.5 weight % of activated clay based on the weight of the oil/fat was added, and a decolorization treatment was performed with stirring under conditions of 110° C. and 1,330 Pa for 10 minutes. After the decolorization was completed, the oil/fat from which the activated clay was removed was deodorized under conditions of 230° C., 266 Pa, and an amount of vapor used of 3 weight % for 90 minutes. After the deodorization, glycidol fatty acid ester contained in the oil/fat was analyzed.

Example 2

A physically refined palm oil having a 3-MCPD concentration of 0.45 mg/kg was subjected to a decolorizing-deodorizing step. 0.1 weight % of a 85% phosphoric acid aqueous solution based on the weight of the oil/fat was added to a physically refined palm oil as a raw material. 1.5 weight % of activated clay based on the weight of the oil/fat was added and a decolorization treatment was performed under conditions of 110° C. and 1,330 Pa for 10 minutes. After the decolorization was completed, the oil/fat from which the activated clay was removed was deodorized under conditions of 230° C., 266 Pa, and an amount of vapor used of 3 weight % for 90 minutes. After the deodorization, glycidol fatty acid ester contained in the oil/fat was analyzed.

Example 3

An oil/fat containing a physically refined palm oil having an iodine value of 53, a physically refined palm fractionated oil having an iodine value of 31, and a high erucic acid rapeseed extremely hardened oil mixed at a ratio of 44:57:3 was subjected to a transesterification reaction using 0.2 weight % sodium methoxide as a catalyst. The reaction temperature was set to 80° C., and the reaction time was set to 30 minutes. After the reaction was completed, 5 weight % of a 50% citric acid aqueous solution was added to the oil/fat stirred at a rotational speed of 5,000 rpm using a homo mixer, and the mixture was brought into contact for 1 minute. Then, 20 weight % of warm water at 80° C. was added, the mixture was treated for 5 minutes, and the oil/fat was washed with water. The oil/fat washed with water was centrifuged, the aqueous phase was removed, and a dehydration treatment was then performed under conditions of 110° C. and 1,330 Pa for 10 minutes. The 3-MCPD concentration in the transesterified oil obtained in this manner was 0.14 mg/kg. This transesterified oil was subjected to a decolorizing-deodorizing step. 0.1 weight % of a 50% citric acid aqueous solution based on the weight of the oil/fat was added to a physically refined palm oil as a raw material, and additionally, 1.5 weight % of activated clay based on the weight of the oil/fat was added, and a decolorization treatment was performed with stirring under conditions of 110° C. and 1,330 Pa for 10 minutes. After the decolorization was completed, the oil/fat from which the activated clay was removed was deodorized under conditions of 250° C., 266 Pa, and an amount of vapor used of 3 weight % for 90 minutes. After the deodorization, glycidol fatty acid ester contained in the oil/fat was analyzed.

Example 4

A physically refined palm oil having a 3-MCPD concentration of 1.01 mg/kg was subjected to a decolorizing-deodorizing step. 0.1 weight % of a 50% citric acid aqueous solution based on the weight of the oil/fat was added to a physically refined palm oil as a raw material. 1.5 weight % of activated clay based on the weight of the oil/fat was added, and a decolorization treatment was performed with stirring under conditions of 110° C. and 1,330 Pa for 10 minutes. After the decolorization was completed, the oil/fat from which the activated clay was removed was deodorized under conditions of 250° C., 266 Pa, and an amount of vapor used of 3 weight % for 90 minutes. After the deodorization, glycidol fatty acid ester contained in the oil/fat was analyzed.

Comparative Example 1

A physically refined palm oil having a 3-MCPD concentration of 2.12 mg/kg was subjected to a decolorizing-deodorizing step. 0.1 weight % of a 50% citric acid aqueous solution based on the weight of the oil/fat was added to a physically refined palm oil as a raw material. 1.5 weight % of activated clay based on the weight of the oil/fat was added, and a decolorization treatment was performed under conditions of 110° C. and 1,330 Pa for 10 minutes. After the decolorization was completed, the oil/fat from which the activated clay was removed was deodorized under conditions of 230° C., 266 Pa, and an amount of vapor used of 3 weight % for 90 minutes. After the deodorization, glycidol fatty acid ester contained in the oil/fat was analyzed.

Comparative Example 2

A physically refined palm oil having a 3-MCPD concentration of 0.39 mg/kg was subjected to a decolorizing-deodorizing step. 1.5 weight % of activated clay based on the weight of the oil/fat was added to a physically refined palm oil as a raw material, and a decolorization treatment was performed with stirring under conditions of 110° C. and 1,330 Pa for 10 minutes. After the decolorization was completed, the oil/fat from which the activated clay was removed was deodorized under conditions of 230° C., 266 Pa, and an amount of vapor used of 3 weight % for 90 minutes. After the deodorization, glycidol fatty acid ester contained in the oil/fat was analyzed.

Comparative Example 3

A physically refined palm oil having a 3-MCPD concentration of 0.22 mg/kg was subjected to a decolorizing-deodorizing step. 0.1 weight % of a 50% citric acid aqueous solution based on the weight of the oil/fat was added to a physically refined palm oil as a raw material. 1.5 weight % of activated clay based on the weight of the oil/fat was added, and a decolorization treatment was performed with stirring under conditions of 110° C. and 1,330 Pa for 10 minutes. After the decolorization was completed, the oil/fat from which the activated clay was removed, and a deodorizing treatment was performed under conditions of 200° C., 266 Pa, and an amount of vapor used of 3 weight % for 90 minutes. After the deodorization, glycidol fatty acid ester contained in the oil/fat was analyzed.

Comparative Example 4

A physically refined palm oil having a 3-MCPD concentration of 1.01 mg/kg was subjected to a decolorizing-deodorizing step. 1.5 weight % of activated clay based on the weight of the oil/fat was added, and a decolorization treatment was performed with stirring under conditions of 110° C. and 1,330 Pa for 10 minutes. After the decolorization was completed, 0.1 weight % of a 50% citric acid aqueous solution based on the weight of the oil/fat was added to the oil/fat from which the activated clay was removed, and immediately, a deodorizing treatment was performed under conditions of 250° C., 266 Pa, and an amount of vapor used of 3 weight % for 90 minutes. After the deodorization, glycidol fatty acid ester contained in the oil/fat was analyzed.

Comparative Example 5

A physically refined palm oil having a 3-MCPD concentration of 1.01 mg/kg was subjected to a decolorizing-deodorizing step. 0.05 weight % of citric acid powder based on the weight of the oil/fat was added to a physically refined palm oil as a raw material. 1.5 weight % of activated clay based on the weight of the oil/fat was added, and a decolorization treatment was performed with stirring under conditions of 110° C. and 1,330 Pa for 10 minutes. After the decolorization was completed, the oil/fat from which the activated clay was removed was deodorized under conditions of 250° C., 266 Pa, and an amount of vapor used of 3 weight % for 90 minutes. After the deodorization, glycidol fatty acid ester contained in the oil/fat was analyzed.

Comparative Example 6

A physically refined palm oil having a 3-MCPD concentration of 1.01 mg/kg was subjected to a decolorizing-deodorizing step. 1.5 weight % of activated clay based on the weight of the oil/fat was added, and a decolorization treatment was performed with stirring under conditions of 110° C. and 1,330 Pa for 10 minutes. After the decolorization was completed, 0.05 weight % of citric acid powder based on the weight of the oil/fat was added to the oil/fat from which the activated clay was removed, and immediately, a deodorizing treatment was performed under conditions of 250° C., 266 Pa, and an amount of vapor used of 3 weight % for 90 minutes. After the deodorization, glycidol fatty acid ester contained in the oil/fat was analyzed.

Comparative Example 7

A physically refined palm oil having a 3-MCPD concentration of 1.17 mg/kg was subjected to a decolorizing-deodorizing step. 0.1 weight % of a 50% citric acid aqueous solution was added to the oil/fat stirred at a rotational speed of 5,000 rpm using a homo mixer, and the mixture was brought into contact for 1 minute. Then, 20 weight % of warm water at 80° C. was added, the mixture was treated for 5 minutes, and the oil/fat was washed with water. The oil/fat washed with water was centrifuged, the aqueous phase was removed, and a dehydration treatment was then performed under conditions of 110° C. and 1,330 Pa for 10 minutes. 1.5 weight % of activated clay based on the weight of the oil/fat was added, and a decolorization treatment was performed with stirring under conditions of 110° C. and 1,330 Pa for 10 minutes. After the decolorization was completed, the oil/fat from which the activated clay was removed was deodorized under conditions of 250° C., 266 Pa, and an amount of vapor used of 3 weight % for 90 minutes. After the deodorization, glycidol fatty acid ester contained in the oil/fat was analyzed.

Comparative Example 8

An oil/fat containing a physically refined palm oil having an iodine value of 53, a physically refined palm fractionated oil having an iodine value of 31, and a high erucic acid rapeseed extremely hardened oil mixed at a ratio of 44:57:3 was subjected to a transesterification reaction using a 0.2 weight % of sodium methoxide as a catalyst. The reaction temperature was set to 80° C., and the reaction time was set to 30 minutes. After the reaction was completed, 5 weight % of a 50% citric acid aqueous solution was added to the oil/fat stirred at a rotational speed of 5,000 rpm using a homo mixer, and the mixture was brought into contact for 1 minute. Then, 20 weight % of warm water at 80° C. was added, the mixture was treated for 5 minutes, and the oil/fat was washed with water. The oil/fat washed with water was centrifuged, the aqueous phase was removed, and a dehydration treatment was then performed under conditions of 110° C. and 1,330 Pa for 10 minutes. The 3-MCPD concentration in the transesterified oil obtained in this manner was 0.14 mg/kg. This transesterified oil was subjected to a decolorizing-deodorizing step. 1.5 weight % of activated clay based on the weight of the oil/fat was added, and a decolorization treatment was performed with stirring under conditions of 110° C. and 1,330 Pa for 10 minutes. After the decolorization was completed, the oil/fat from which the activated clay was removed was deodorized under conditions of 250° C., 266 Pa, and an amount of vapor used of 3 weight % for 90 minutes. After the deodorization, glycidol fatty acid ester contained in the oil/fat was analyzed.

Comparative Example 9

A physically refined palm oil having a 3-MCPD concentration of 1.01 mg/kg was subjected to a decolorizing-deodorizing step. 1.5 weight % of activated clay based on the weight of the oil/fat was added, and a decolorization treatment was performed with stirring under conditions of 110° C. and 1,330 Pa for 10 minutes. After the decolorization was completed, the oil/fat from which the activated clay was removed was deodorized under conditions of 250° C., 266 Pa, and an amount of vapor used of 3 weight % for 90 minutes. After the deodorization, 0.1 weight % of a 50% citric acid aqueous solution was added while the vacuum was maintained at 1,330 Pa. Finally, glycidol fatty acid ester contained in the oil/fat was analyzed.

Table 1 shows the analysis results of the oils/fats obtained in Examples 1 to 4 and Comparative Examples 1 to 9 and the evaluation results of the flavor. The flavor was evaluated by a plurality of people, the score was 5 for the best flavor (tasteless and odorless), and the score decreased as the flavor worsened in the evaluation. The score of the flavor in the table indicates an average value of the scores scored by each evaluator. 3 points or more was satisfactory, and less than 3 points was unsatisfactory.

TABLE 1

|  | 3-MCPD concentration in raw oil/fat (mg/kg) | Equal amount of glycidol after refining (mg/kg) | Flavor after refining |
|---|---|---|---|
| Example 1 | 0.31 | 0.23 | 4.6 |
| Example 2 | 0.45 | 0.35 | 4.4 |
| Example 3 | 0.14 | 0.78 | 4.6 |
| Example 4 | 1.01 | 0.38 | 4.8 |
| Comparative Example 1 | 2.12 | 1.45 | 4.6 |
| Comparative Example 2 | 0.39 | 1.39 | 3.8 |
| Comparative Example 3 | 0.22 | 0.10 | 2.8 |
| Comparative Example 4 | 1.01 | 1.02 | 4.4 |
| Comparative Example 5 | 1.01 | 1.31 | 4.4 |
| Comparative Example 6 | 1.01 | 1.01 | 4.6 |
| Comparative Example 7 | 1.17 | 1.67 | 4.5 |
| Comparative Example 8 | 0.16 | 1.27 | 4.5 |
| Comparative Example 9 | 1.01 | 1.25 | 4.6 |

As shown in Table 1, in examples in which a palm oil having a 3-MCPD concentration in the raw material of 1.5 mg/kg or less was used as a raw material, and a citric acid and phosphoric acid aqueous solution was added, the flavor was favorable, and the amount of glycidol and glycidol fatty acid esters could be reduced to 1.0 mg/kg or less in an equal amount of glycidol. The deodorizing temperature in this case was 230 to 260° C.

In Comparative Example 1, the 3-MCPD concentration in the palm oil as a raw material was 1.5 mg/kg or more, and in this case, an equal amount of glycidol after deodorization was 1.45 mg/kg.

In Comparative Example 2, no citric acid aqueous solution and/or phosphoric acid aqueous solution was added during decolorization, but an equal amount of glycidol in this case was 1.39 mg/kg.

In Comparative Example 3, the deodorizing temperature was set to 200° C., but in this case, the flavor was 2.8 points.

In Comparative Example 4 in which a citric acid aqueous solution was added immediately before deodorization, Comparative Example 5 and Comparative Example 6 in which citric acid powder was used, and Comparative Examples 4 to 9 in which the timing at which the citric acid aqueous solution was added was different from that of the examples, an equal amount of glycidol after refining could not be reduced to 1.0 mg/kg or less.

As the physically refined palm oil used in the present invention, a physically refined palm oil degummed with phosphoric acid was used as in Patent Literature 2 and 3, but in comparative examples that did not satisfy the formulation of the present invention, the content of glycidol and glycidol fatty acid esters could not be reduced.

The above results are summarized in Table 2. An edible oil/fat having a favorable flavor and in which the content of glycidol and glycidol fatty acid esters was reduced to 1.0 mg/kg or less in an equal amount of glycidol could be obtained only when a citric acid aqueous solution and/or phosphoric acid aqueous solution was added during the decolorization work step, a raw material having a 3-MCPD concentration in a raw oil of 1.5 mg/kg or less was used, and deodorizing was performed at a deodorizing temperature of 230 to 260° C.

TABLE 2

| | Refining conditions | | | Quality of refined oil | |
|---|---|---|---|---|---|
| | 3-MCPD concentration in raw oil/fat was 1.5 mg/kg or less | Add acid to aqueous solution during decolorization work step | Deodorizing temperature was 230 to 260° C. | Glycidol concentration | Flavor |
| Example | ○ | ○ | ○ | ○ | ○ |
| Comparative Example 1 | x | ○ | ○ | x | ○ |
| Comparative Example 2 | ○ | x | ○ | x | ○ |
| Comparative Example 3 | ○ | ○ | x | ○ | x |
| Comparative Examples 4 to 9 | ○ | x | ○ | x | ○ |

INDUSTRIAL APPLICABILITY

According to the present invention, it is possible to manufacture an oil/fat in which the content of glycidol and glycidol fatty acid esters, which may adversely affect human health, is reduced without impairing the flavor.

The invention claimed is:

1. A method for manufacturing an edible oil/fat with a reduced content of glycidol and glycidol fatty acid esters, in which a physically refined palm oil (RBDPO) having a 3-MCPD concentration of 1.5 mg/kg or less is used as a raw material and a step of decolorizing and deodorizing is carried out,
    wherein a step of bleaching and deodorizing includes a decolorizing work step and a deodorizing work step,
    the decolorizing work step includes a step of adding an aqueous solution of an acid and a decolorization step,
    the step of adding the aqueous solution of the acid is included immediately before the decolorization step in the decolorizing work step, no other step is provided between the step of adding the aqueous solution of the acid and the decolorization step, and
    the content of glycidol and glycidol fatty acid esters is 1.0 mg/kg or less calculated as an equivalent glycidol after the step of decolorizing and deodorizing, wherein the step of deodorizing is performed under following conditions:
    a degree of vacuum of 100 to 800 Pa,
    an amount of water vapor used of 0.5 to 5 weight %,
    a deodorizing temperature of 230 to 260° C.

2. The method for manufacturing an edible oil/fat in which the content of glycidol and glycidol fatty acid esters is reduced according to claim 1,
    wherein 0.01 to 10 weight % of the following aqueous solution as the acid is added:
    a citric acid and/or phosphoric acid aqueous solution having a concentration of 1 to 85 weight %.

* * * * *